United States Patent
Martinez Huerta et al.

(10) Patent No.: US 12,038,522 B2
(45) Date of Patent: Jul. 16, 2024

(54) ADAPTIVE ANCHOR SELECTION AND TARGET POSITION ESTIMATION

(71) Applicant: Texas Instruments Incorporated, Dallas, TX (US)

(72) Inventors: Borja Martinez Huerta, Sant Cugat (ES); Guillem Boquet Pujadas, Mataró (ES); Xavier Vilajosana Guillen, Cardedeu (ES); Anand Ganesh Dabak, Plano, TX (US); Kaichien Tsai, Allen, TX (US); Jianwei Zhou, Allen, TX (US); Danil Shalumov, Or Aqiva (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 328 days.

(21) Appl. No.: 17/522,732

(22) Filed: Nov. 9, 2021

(65) Prior Publication Data
US 2023/0141360 A1 May 11, 2023

(51) Int. Cl.
*G01S 5/02* (2010.01)
*G01S 5/04* (2006.01)
*H04W 4/00* (2018.01)
*H04W 64/00* (2009.01)

(52) U.S. Cl.
CPC .............. *G01S 5/0244* (2020.05); *G01S 5/04* (2013.01); *H04W 64/00* (2013.01)

(58) Field of Classification Search
CPC ......... G01S 5/0244; G01S 5/04; H04W 64/00
USPC .......................................................... 342/451
See application file for complete search history.

(56) References Cited

U.S. PATENT DOCUMENTS

| 10,338,193 B2 * | 7/2019 | Beko .................... G01S 5/02213 |
| 2018/0143284 A1 * | 5/2018 | Wang ......................... G01S 3/74 |

FOREIGN PATENT DOCUMENTS

| CN | 103202075 B * | 6/2016 | ............... G01S 3/14 |

* cited by examiner

*Primary Examiner* — Harry K Liu
(74) *Attorney, Agent, or Firm* — Mandy Barsilai Fernandez; Frank D. Cimino (57) ABSTRACT

In an example method of target position estimation, the method includes calculating initial estimated positions of a target transmitter. Each of the initial estimated positions is based on an angle of arrival estimate received from a locator. The method includes generating an error projection associated with each of the initial estimated positions. The error projection is based on azimuth and elevation error characteristics of the locator associated with the initial estimated position. The method includes creating a select group of the locators based on overlaps of the error projections, wherein the select group of locators comprises a subset of the locators. The method includes calculating a refined estimate of the position of the target transmitter based on the initial estimated positions associated with the select group of locators.

21 Claims, 11 Drawing Sheets

ADAPTIVE ANCHOR SELECTION AND TARGET POSITION ESTIMATION

TECHNICAL FIELD

This description relates to position estimation of a target wireless emitter, and more particularly to techniques for adaptive selection of anchors, that use direction finding techniques, including angle of arrival (AoA), to estimate target position.

BACKGROUND

Some location systems are designed to estimate the position of a target transmitter based on a measured angle of arrival (AoA) of the transmitted signal, as received by an anchor device, a locator device, or other receiver devices. The estimated position is subject to error, however, which can be introduced from multiple sources. In some applications, where relatively high position accuracy is required, such errors may be unacceptable.

SUMMARY

In an example method of target position estimation, the method includes calculating initial estimated positions of a target transmitter. Each of the initial estimated positions is based on a direction finding estimate (e.g., an angle of arrival estimate) received from a locator. The method also includes generating a projection on a positioning plane of the angular error associated with each of the initial estimated positions. The projection may be an error ellipse or other shape. The projection is based on pre-characterized azimuth and elevation errors of the locator associated with that initial estimated position. The method further includes selecting a group of the locators based on overlaps of the error projections, which in some cases may include eliminating one or more locators that may be subject to environmental errors that exceed the pre-characterized errors. The method further includes calculating a refined estimate of the position of the target transmitter based on the initial estimated positions associated with the selected group of locators.

DETAILED DESCRIPTION

Techniques are described herein for adaptive anchor selection and target position estimation. As described above, some location systems are designed to estimate the position of a target transmitter based on a measured angle of arrival (AoA) of the transmitted signal, as received by two or more locator devices (also referred to herein as anchor devices, or more simply, locators or anchors). The term AoA, as used herein, refers to the output of any suitable type of direction finding system or technique that provides an angular measurement (e.g., an azimuth and elevation angle) of the transmitted signal. The estimated position is subject to error, however, which can be introduced from multiple sources including both pre-characterized errors (e.g., instrumentation errors that are inherent in the equipment) and environmental errors (e.g., multipath errors). Both types of errors can be different for each locator. In some applications, where relatively high position accuracy is required, such errors may be unacceptable, and the techniques described herein may be employed to reduce the error and provide a more accurate estimate of the target position by adaptively selecting locators that provide position estimates which are compatible with their pre-characterized error (e.g., for which there exists some overlap in the regions of their pre-characterized error projections). The selected locators may have the least, or otherwise lower, error relative to other available locators.

Accordingly, a location processing system is described herein, along with a methodology for AoA based target position estimation using adaptively selected anchors. In some embodiments, a location processor is configured to receive AoA estimates from a number of anchor/locator devices that are distributed throughout a region of interest, and to estimate the position of the target based on a combination of some or all of those AoA estimates. The region of interest may be, for example, a room, office, conference room, factory floor, warehouse, store, shopping mall, or any area in which it is desirable to locate and track a transmitting target. The transmitting target may be, for example, a Bluetooth device, a Wi-Fi device, or a cellular device, or any other device that emits a radio frequency (RF), acoustic, ultrasound, millimeter wave, or otherwise wireless signal. The location processing system is useful in a wide variety of applications, such as tracking a human moving within a geographic area or a robot as it moves about a warehouse floor. The disclosed techniques provide for determining whether the initial position estimate for a given locator falls within the expected range. The expected range is determined by a majority of locators agreeing on an overlapping area associated with the projection of their pre-characterized errors onto the positioning plane. At a high level of description, the disclosed techniques can be used to determine the extent to which locators agree on target position and then calculate a refined position based on information from the locators that are in closest agreement. Data from the remaining one or more locators may be considered as outliers and discarded.

In an example, a location processing system includes an initial position estimator configured to calculate initial estimated positions of a target transmitter. Each of the initial estimated positions is based on an AoA estimate received from one of the locators. The system also includes a confidence area generator configured to generate an error projection associated with each of the initial estimated positions. The error projection is a projection of the error in the positioning plane expressed as a shape, for example as an ellipse, a parabola, a hyperbola, a rectangle, a probability density function, or any other suitable shape. For illustration clarity, the error projections are shown as ellipses in the FIGS. The error projection is based on known or predetermined azimuth and elevation error characteristics of the locator associated with the initial estimated position. The system further includes a locator selection processor configured to select a group of the locators based on overlaps of the error projections. The selected group may include two or more of the locators. The system further includes a refined position estimator configured to calculate a refined estimate of the position of the target transmitter based on the initial estimated positions associated with the select group of locators, as described below.

Also, in this description, a method for target position estimation includes calculating initial estimated positions of a target transmitter, wherein each of the initial estimated positions is based on an AoA estimate received from a locator. The method also includes generating an error projection associated with each of the initial estimated positions, wherein the error projection is based on azimuth and elevation error characteristics of the locator associated with the initial estimated position. The method further includes selecting a group of the locators based on overlaps of the error projections and calculating a refined estimate of the position of the target transmitter based on the initial estimated positions associated with the select group of locators, as described below. Note the select group of locators may include all available locators or a subset of less than all available locators (in the case where one or more locators are eliminated for purposes of calculating the refined estimate). The process may be iterated over time, and at each time step different locators may be selected for the refined estimate calculation.

The techniques described herein may provide improved location accuracy, compared to existing systems that estimate location based on AoA data provided by all available locators without regard to the quality of the data.

System Architecture

Figure 1:
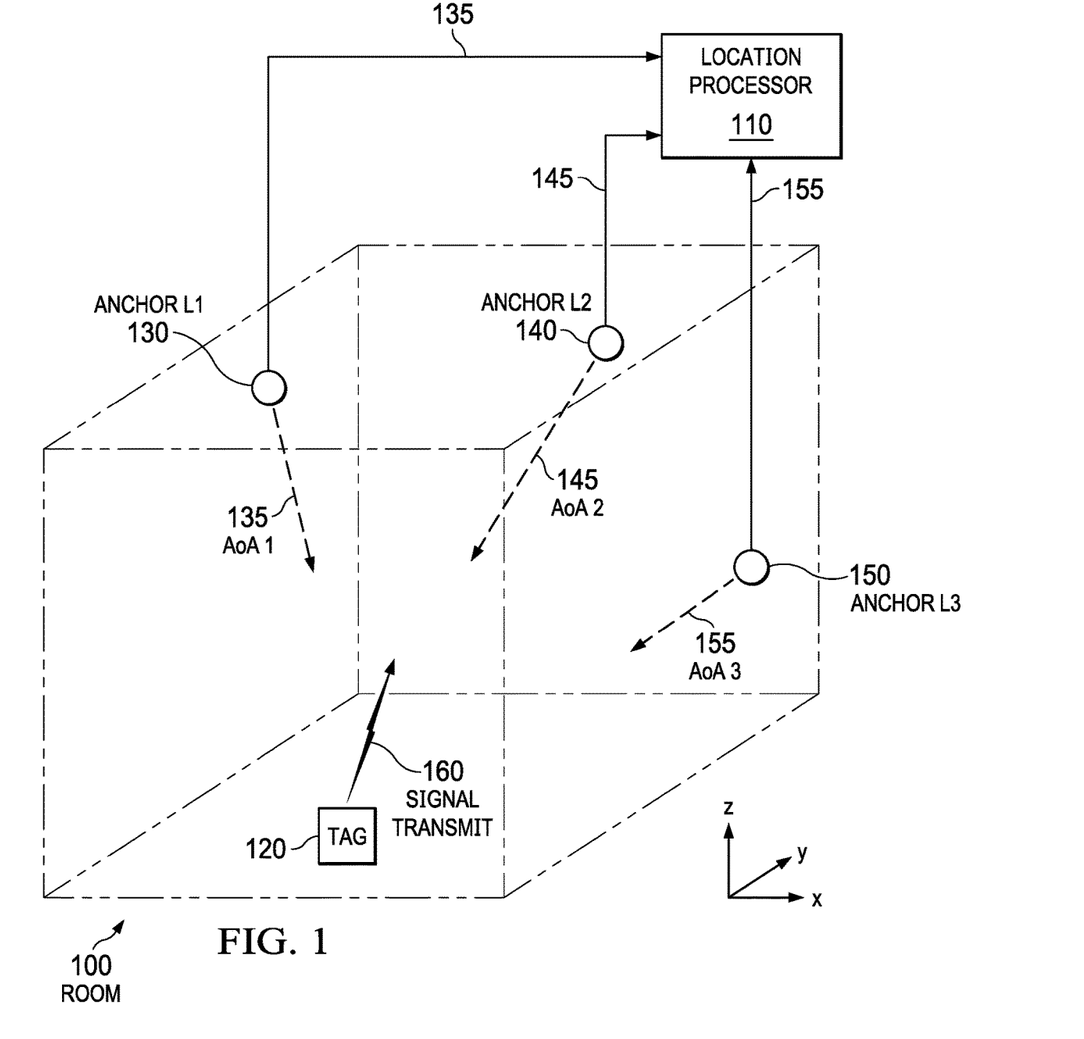
FIG. 1 illustrates an implementation of a location processing system, according to an embodiment.

FIG. 1 illustrates an implementation of a location processing system, according to an embodiment. A room 100 is shown to include a transmitting tag or target 120, the location of which is to be determined. A coordinate system is shown for the room in which the floor of the room is in the x-y plane and height above the floor is given by the z axis. The room is also shown to include three anchors/locators L1 130, L2 140, and L3 150, although any number of anchors may be employed. The room 100 may be any type of space, including for example, an office, a conference room, a factory floor, a warehouse, a store, or a shopping mall, to name a few. Note the room 100 may have an irregular shape and need not be square or rectangular. Anchors 130 and 140 are shown, in this example, to be located on the ceiling, while anchor 150 is shown to be located on one of the walls. In general, the anchors can be located at any suitable or convenient position within room 100. Note that the shape complexity of room 100 may call for many such anchors, to provide full coverage of the space. The anchors 130, 140, 150 are devices that are configured to receive the signal 160 that is transmitted by the target 120 and to estimate an AoA of that signal. In some embodiments, the signal 160 may be a beacon, a tone, or a signal that includes an identification pattern. For example, anchor 130 may estimate a first AoA 135, anchor 140 may estimate a second AoA 145, and anchor 150 may estimate a third AoA 155. In some embodiments, the anchors/locators are Bluetooth anchors or Wi-Fi anchors, and the target transmitter is a Bluetooth device or a Wi-Fi device (or a cellular device using Wi-Fi transmissions) that is configured to transmit a pulse, a signal, or other such message (e.g., a beacon signal in the case of Bluetooth). Such devices may be employed for other purposes (e.g., a Wi-Fi access point or other communication tasks) in addition to their function in the location position system. In some embodiments, the target transmitter may be a cellular device transmitting on a cellular network (e.g, 4G, LTE, 5G, etc.) and the anchors/locators may be a cellular base station or other system configured to receive such transmissions.

A location processor 110 is also shown in FIG. 1. Location processor 110 is configured to receive the AoA estimates from each anchor and calculate a target position based on those estimates. The AoA estimates may be transmitted from the anchors to the location processor over a wireless channel of any suitable type, and/or through a wired connection (e.g., some anchors closer to processor 110 may be wired, and other anchors farther from processor 110 may communicate wirelessly with processor 110). In some embodiments, the location processor may be incorporated or embedded in one of the anchors.

In the absence of any estimation error, the three AoAs 135, 145, 150 are expected to intersect at the location of the target 120. In an actual system, however, errors may be present in the AoA estimation and so different anchors may indicate different positions for the target. One type of error is due to technological limitations of the measurement device (e.g., the AoA measurement system used by the anchor). These errors may be referred to as instrumentation errors and may be present even under ideal measurement conditions. Such instrumentation errors can be pre-characterized in a statistical manner, for example, during manufacture or final test, or in an empirical manner, for example, once the system is deployed within room or space 100. The error may be expressed as an error ellipse with a major and minor axis representing a standard deviation of azimuth and elevation errors respectively, as described below, or may be expressed as a pre-characterized or otherwise pre-defined error.

Another type of error is due to propagation effects. For example, the transmitted signal may reflect off surfaces (e.g., walls and/or other objects in the room or space 100). These reflections create a multipath effect and, if received by the anchors, the reflections can appear to be arriving from angles other than the true AoA. Unlike instrumentation errors, these types of environmental error generally cannot be characterized prior to deployment; moreover, changes in a given room or space 100 (e.g., movement of objects) can cause changes in the environmental error.

Figure 2:
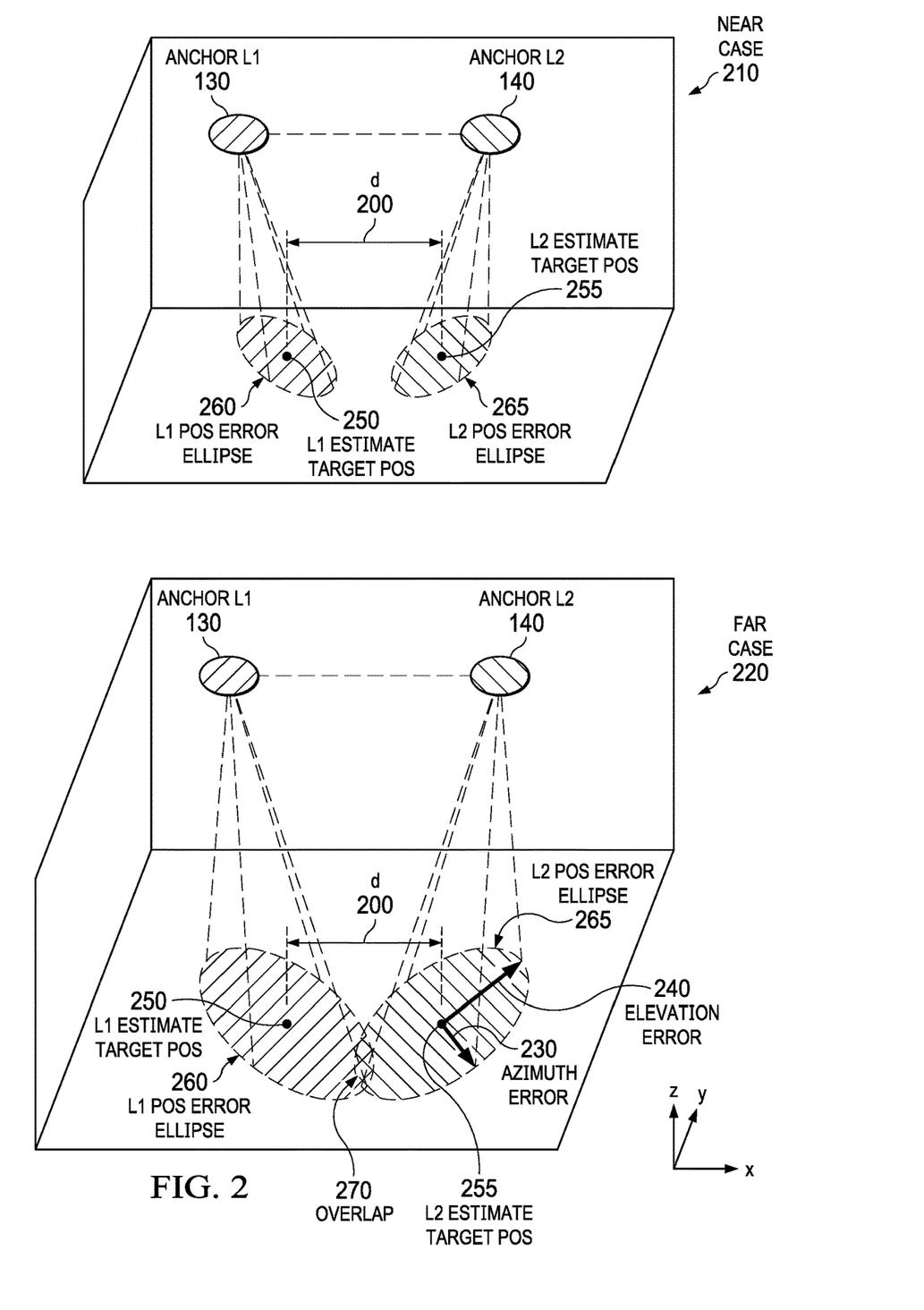
FIG. 2 illustrates the geometry of angle of arrival (AoA) based position estimation, according to an embodiment.

FIG. 2 illustrates the geometry of AoA based position estimation using pre-characterized error projections, according to an embodiment. Two anchors L1 130 and L2 140 are shown along with estimated target positions 250, 255 and associated error ellipses 260, 265, for both a near case 210 and a far case 220. For example, anchor L2 error ellipse 265 is shown with a minor axis based on pre-characterized azimuth error 230 and a major axis based on pre-characterized elevation error 240. As shown, the size of the error ellipse is a function of distance from the anchor, as well as the pre-characterized error (e.g., azimuth and elevation error) associated with the anchor. So, for example, in the near case 210, where the positioning plane (e.g., x-y plane in which the target is expected to be found) is relatively closer to the anchors, the error ellipses encompass a smaller area than in the far case 220, where the positioning x-y plane is relatively further from the anchors. In both the near case 210 and the far case 220, the target position 250, 255 is estimated by each anchor, based on the AoA angles, and the error ellipses 260, 265 are projected around the estimated position. Due to a combination of instrumentation and environmental errors, the estimated target positions 250, 255 are separated by a distance d 200, which in this example is the same in both the near case 210 and the far case 220, although in general that would not necessarily be the case.

In the near case, the error ellipses are separated (e.g., there is no overlap), while in the far case there is some overlap 270. Thus, in the near case, the errors exceed the expected instrumentation error and are more likely to have a larger environmental error component. As such, one or both of the locators may be discarded from the position estimation process. In the far case, however, there may be a greater proportion of instrumentation related error, as indicated by the overlap, and so the locators may be retained for use in the position estimation process to generate a refined position estimate, as described below. In general, a greater degree of overlap between error projections provides more confidence in the position estimates of the associated locators.

Figure 3:
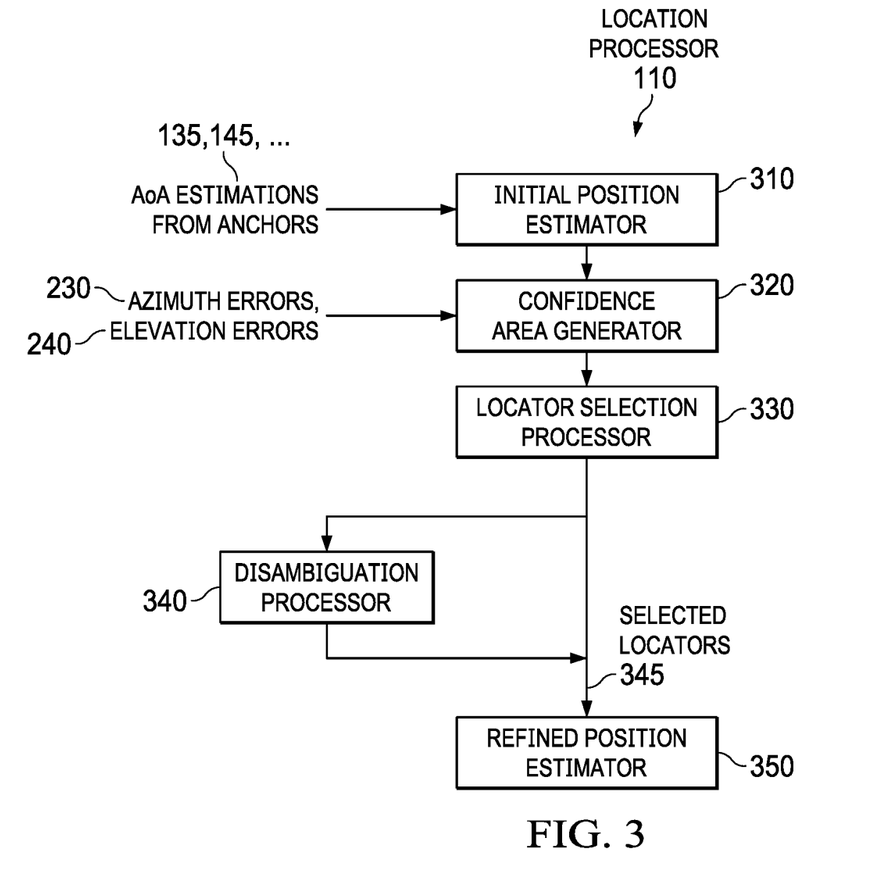
FIG. 3 is a block diagram of the location processing system of FIG. 1, according to an embodiment.

FIG. 3 is a block diagram of the location processing system 110 of FIG. 1, according to an embodiment. The location processor 110 is shown to include an initial position estimator 310, a confidence area generator 320, a locator selection processor 330, a disambiguation processor 340, and a refined position estimator 350.

Figure 4:
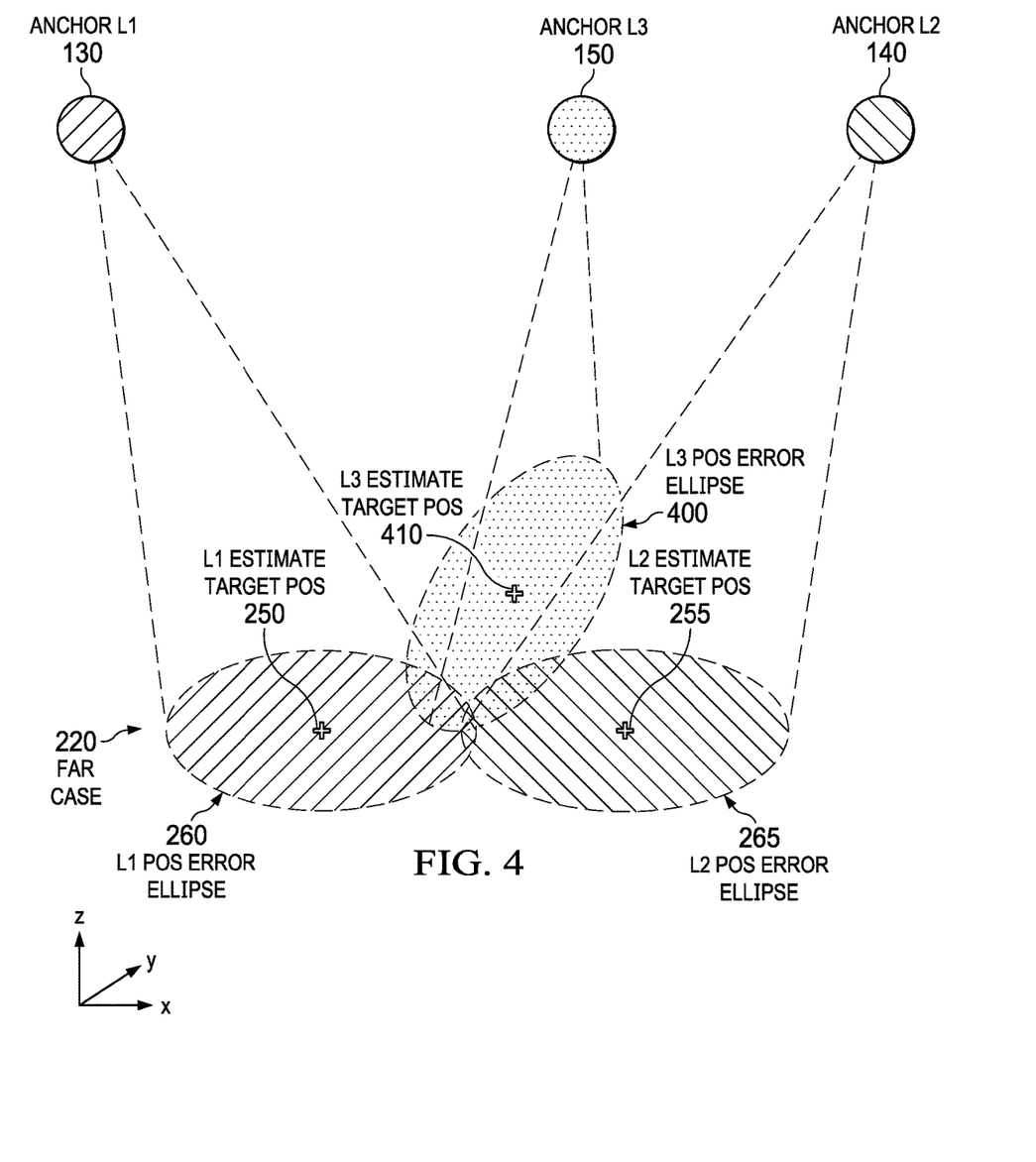
FIG. 4 illustrates intersecting position error ellipses, according to an embodiment.

The initial position estimator 310 is configured to calculate initial estimated positions of a target transmitter. Each of the initial estimated positions is based on an angle of arrival (AoA) estimate 135, 145, 155 received from a locator. For example, each of the initial estimated position may be at a location where the AoA intersects a positioning plane in which the target is expected to be located, such as the floor or some other surface in the room. Or, in some embodiments, each of the initial estimated positions may be at a location defined by the AoA in combination with an estimated range from the locator, where the range is estimated using any other suitable technique. Referring to FIG. 4, initial estimated positions 250, 255, 410 are shown for three locators L1 130, L2 140, and L3 150, respectively.

The confidence area generator 320 is configured to generate an error projection associated with each of the initial estimated positions. The error projection may be based on pre-characterized azimuth and elevation errors 230, 240 of the locator associated with that initial estimated position, and represents an area or region of confidence. Referring to FIG. 4, error ellipses 260, 265, and 400 are shown for the three locators L1 130, L2 140, and L3 150, respectively, according to an embodiment. Although 2-dimensional error ellipses are used for illustration in these examples, the disclosed techniques can be applied to 3-dimensional positioning where spatial volumes would be used instead or areas.

The locator selection processor 330 is configured to create a select group of the locators based on overlaps of the error projections. Overlaps may include intersection of shapes or any combination of continuous density/probability functions. For example, a probability density function (e.g., a multivariate Gaussian probability density function) of the angle errors can be projected in the positioning plane, to represent the probability that for the position estimate at each point of the positioning plane from the point of view of the given locator.

The group may contain two or more, or all of the locators. The selection is accomplished by a majority voting scheme in which an overlap that includes the greatest number of error projections (or an area with the highest combined probability density) is identified, and the locators associated with the error projections in that identified overlap are selected for the group. This is illustrated, for example, in FIG. 6 where several ellipse intersections 660, 670, 680 are shown. The first intersection 660 includes three ellipses 600, 610, 620. The second intersection 670 includes only two ellipses 620, 630, and the third intersection 680 also includes only two ellipses 640, 650. Based on the majority vote, the first intersection 660 is chosen and the locators associated with the three ellipses 600, 610, 620 are selected for further processing.

The disambiguation processor 340 is employed to handle cases where the majority voting scheme results in a tie, for example, where two or more intersections both include the maximum number of error projections. Disambiguation processor 340 is configured to determine that two or more of the intersections include the greatest number of error projections and to select one of the two or more intersections as the identified intersection based on a disambiguation criterion. In some embodiments, the disambiguation criterion may include the size of an area of the overlap. For example, referring to FIG. 7, the first intersection 760 and the third intersection 780 both comprise three error ellipses (the greatest number of intersecting ellipses). The first intersection 760 is chosen, however, because it has the largest intersection area. A similar situation is illustrated in FIG. 8, where the first intersection 860 and the second intersection 870 both comprise three error ellipses, and the second intersection 870 is chosen because it has the largest intersection area. In some embodiments, the disambiguation criterion may include the size of a union of the error ellipses associated with the intersection, a ratio of the size of the area of the intersection to the size of the union of the error ellipses, or a measure of signal strength associated with the AoA estimates. In some embodiments, the disambiguation criterion may be based on the value of the AoA estimate. For example, an AoA estimate which indicates that the target is directly below a locator (to within some threshold angle) may indicate that the AoA estimate is more reliable because the signal path may be relatively direct and free of environmental error.

The refined position estimator 350 is configured to calculate a refined estimate of the position of the target transmitter based on the initial estimated positions associated with the selected group of locators 345 provided by the locator selection processor 330 (and the disambiguation processor 340, in case of a tied vote). In some embodiments, the refined position estimator is configured to calculate centroid locations based on pairs of error ellipses in the identified intersection. The centroid is the arithmetic mean position of all the points in the area of the ellipses that are members of the intersection (e.g., 700, 710, 720 of FIG. 7, or 830, 840, 850 of FIG. 8). This is shown, for example, in FIG. 5A, where selected locators 345 comprise locators 130, 140, 150, because the intersection or overlap 500 included the greatest number of ellipses (other locators and ellipses are not shown in the FIG. for illustration clarity). As such, centroid 510 is calculated based on ellipses 265 and 400, centroid 520 is calculated based on ellipses 260 and 265, and centroid 530 is calculated based on ellipses 260 and 400. The refined estimate 540 is then calculated as an average of the centroid locations.

In some embodiments, the refined position estimator is configured to calculate the refined estimate 540 as the centroid of the intersection among all projected areas. This is illustrated in FIG. 5B, where the point 590 is the centroid of the intersection of the three projected error ellipses 260, 265, 400, and is chosen as the refined estimate 540.

In some embodiments, the refined position estimator is configured to calculate the refined estimate 540 as a least squared error minimization of the initial estimated positions associated with the select group of locators. The least squared error minimization provides the point that minimizes the sum of the distances to the initial estimated positions associated with the select group of locators. In some embodiments, the refined position estimator is configured to calculate the refined estimate 540 as an average of the initial estimated positions associated with the select group of locators. In some embodiments, other suitable arithmetic functions, such as the median, may be used as an alternative to the average.

The process may be iterated over time, for example at N second time intervals or time steps. At each time step, different locators may be selected for the refined estimate calculation because, for example, the target may be moving, and the environmental errors can therefore change. In some embodiments, each locator can receive more than one sample from the same emitter, and thus there can be more than one ellipse for each locator for use in the majority voting technique.

FIG. 4 illustrates intersecting position error ellipses for the far case 220, according to an embodiment. As shown in this FIG., and as discussed above, anchor/locator L1 130 projects an error ellipse 260 with an estimated target position 250 at the center of that ellipse. Likewise, anchor/locator L2 140 projects an error ellipse 265 with an estimated target position 255 at the center of that ellipse, and anchor/locator L3 150 projects an error ellipse 400 with an estimated target position 410 at the center of that ellipse. The near case 210 is not shown because the error ellipses do not intersect in the near case, as shown for example in FIG. 2, and thus no locators are selected, and no refined position estimate is generated.

Figure 5A:
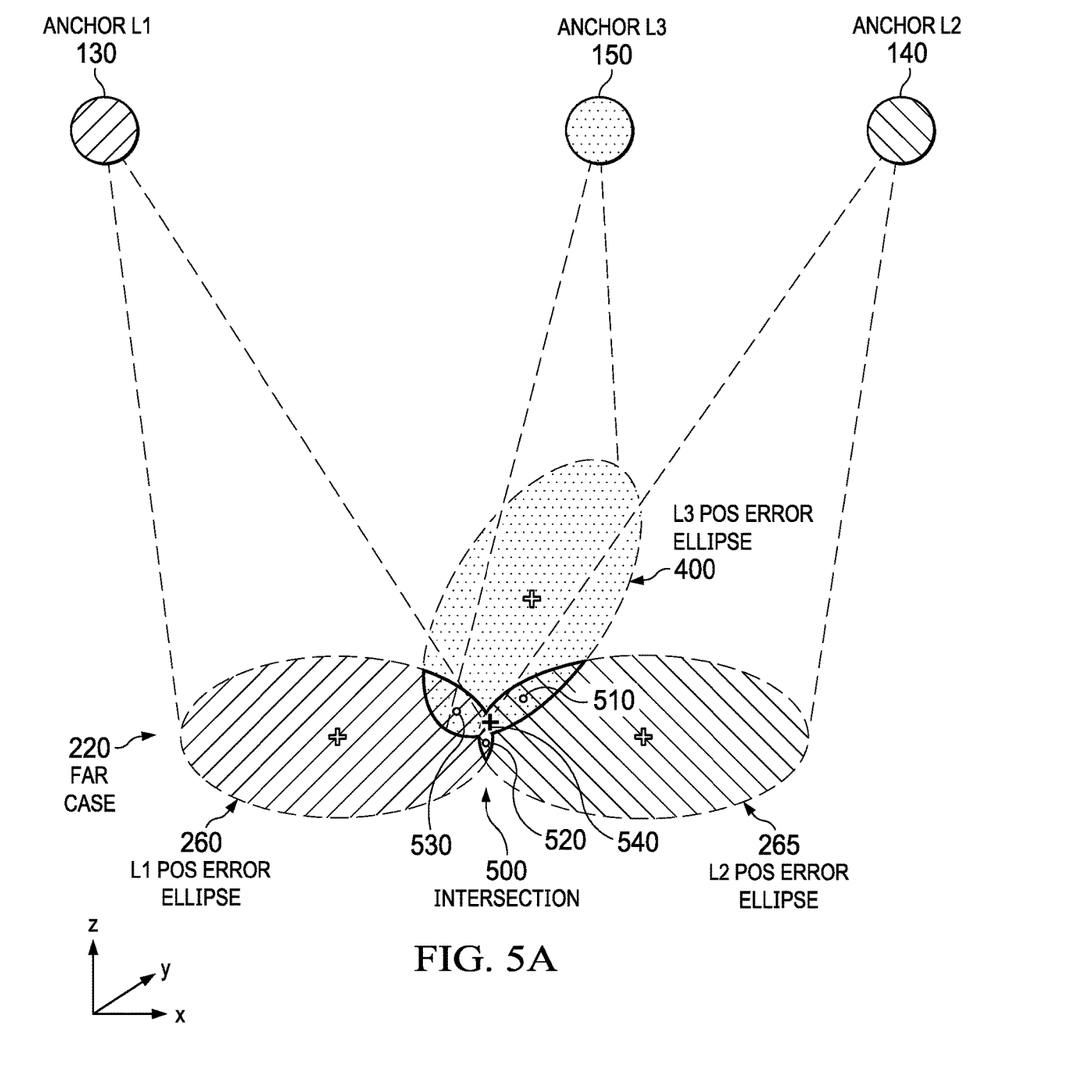
FIG. 5A illustrates an average of centroids of intersecting position error ellipses, according to an embodiment.
Figure 5B:
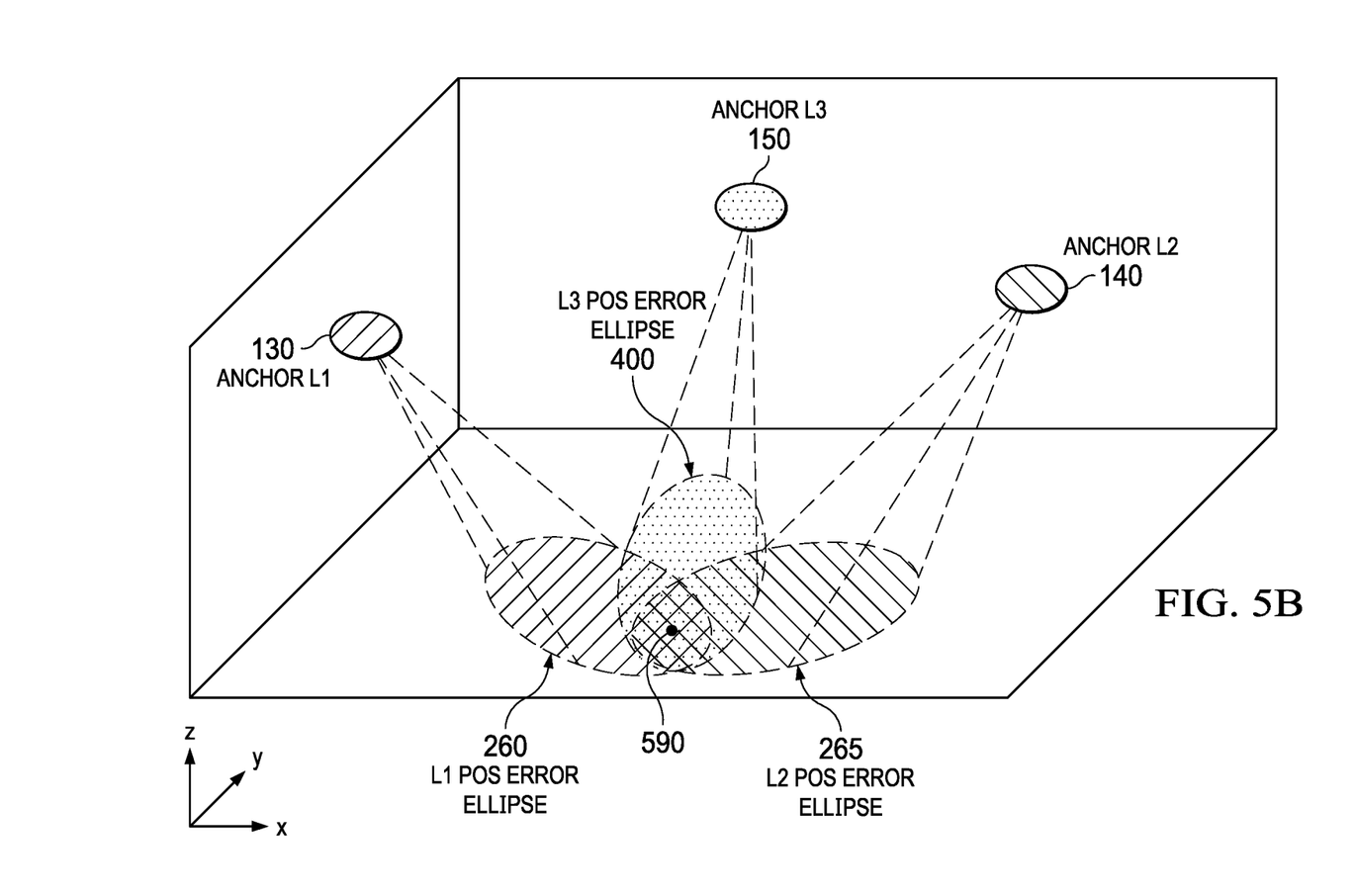
FIG. 5B illustrates the centroid of intersecting position error ellipses, according to an embodiment.

FIG. 5A illustrates an average of centroids of intersecting position error ellipses, according to an embodiment. FIG. 5A is identical to FIG. 4, except for the addition of calculated centroids 510, 520, 530 for each of the pairwise intersections of error ellipses. The refined position estimate 540 is also shown, for example as a calculated average of the centroid locations.

FIG. 5B illustrates the centroid of intersecting position error ellipses, according to an embodiment. FIG. 5B, shows the centroid 590 of the intersection of the three projected error ellipses 260, 265, 400, which, in some embodiments, is chosen as the refined estimate 540.

Figure 6:
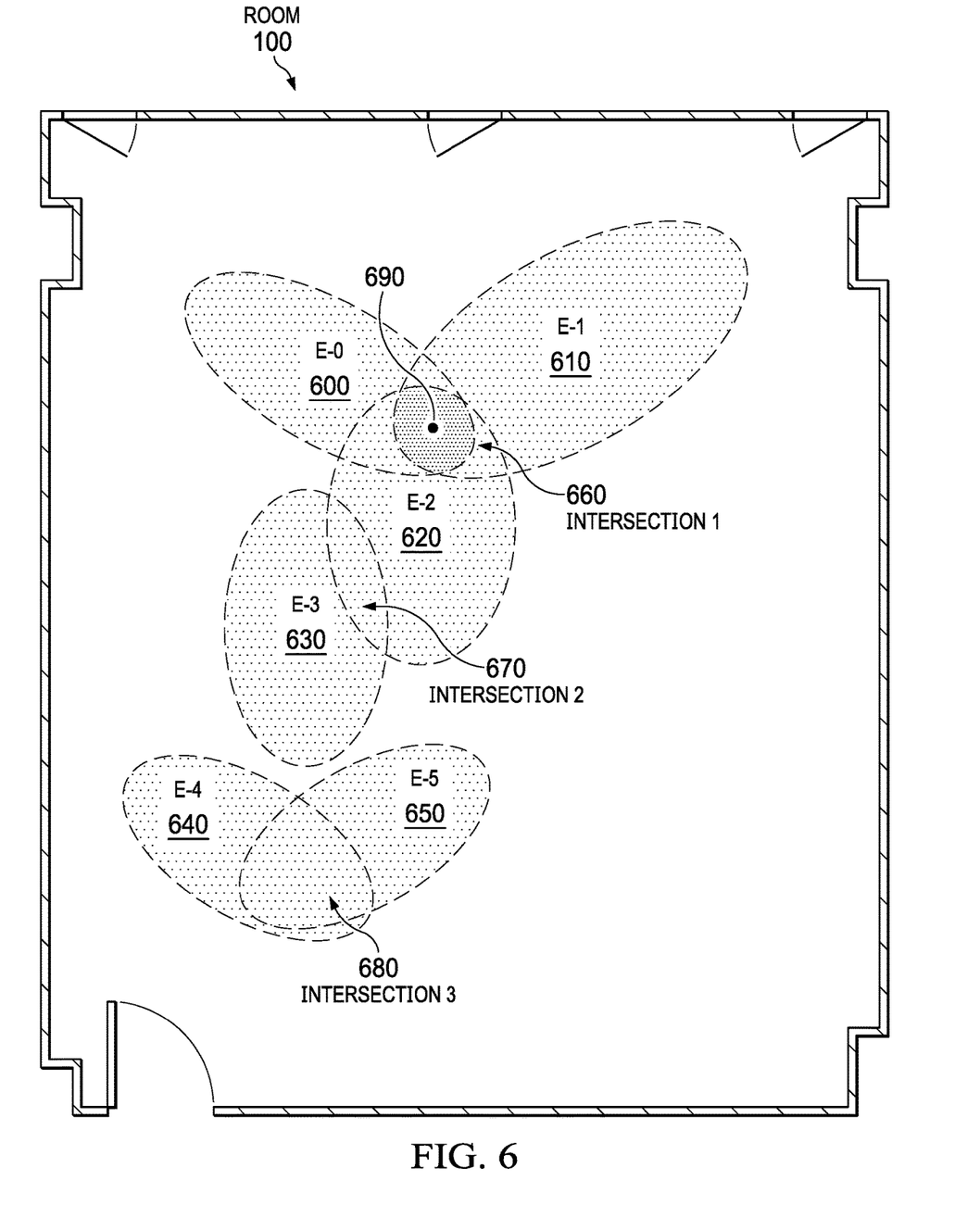
FIG. 6 illustrates a majority voting scheme for locator selection, according to an embodiment.

FIG. 6 illustrates a majority voting scheme for locator selection, according to an embodiment. Several ellipse intersections 660, 670, 680 are shown as projected onto the x-y plane of room 100, in this FIG. The first intersection 660 includes three ellipses 600, 610, 620. The second intersection 670 includes only two ellipses 620, 630, and the third intersection 680 also includes only two ellipses 640, 650. Based on the majority vote technique, the first intersection 660 is chosen and the locators associated with the three ellipses 600, 610, 620 are selected for further processing, as described above, to generate a refined position estimate 690.

Figure 7:
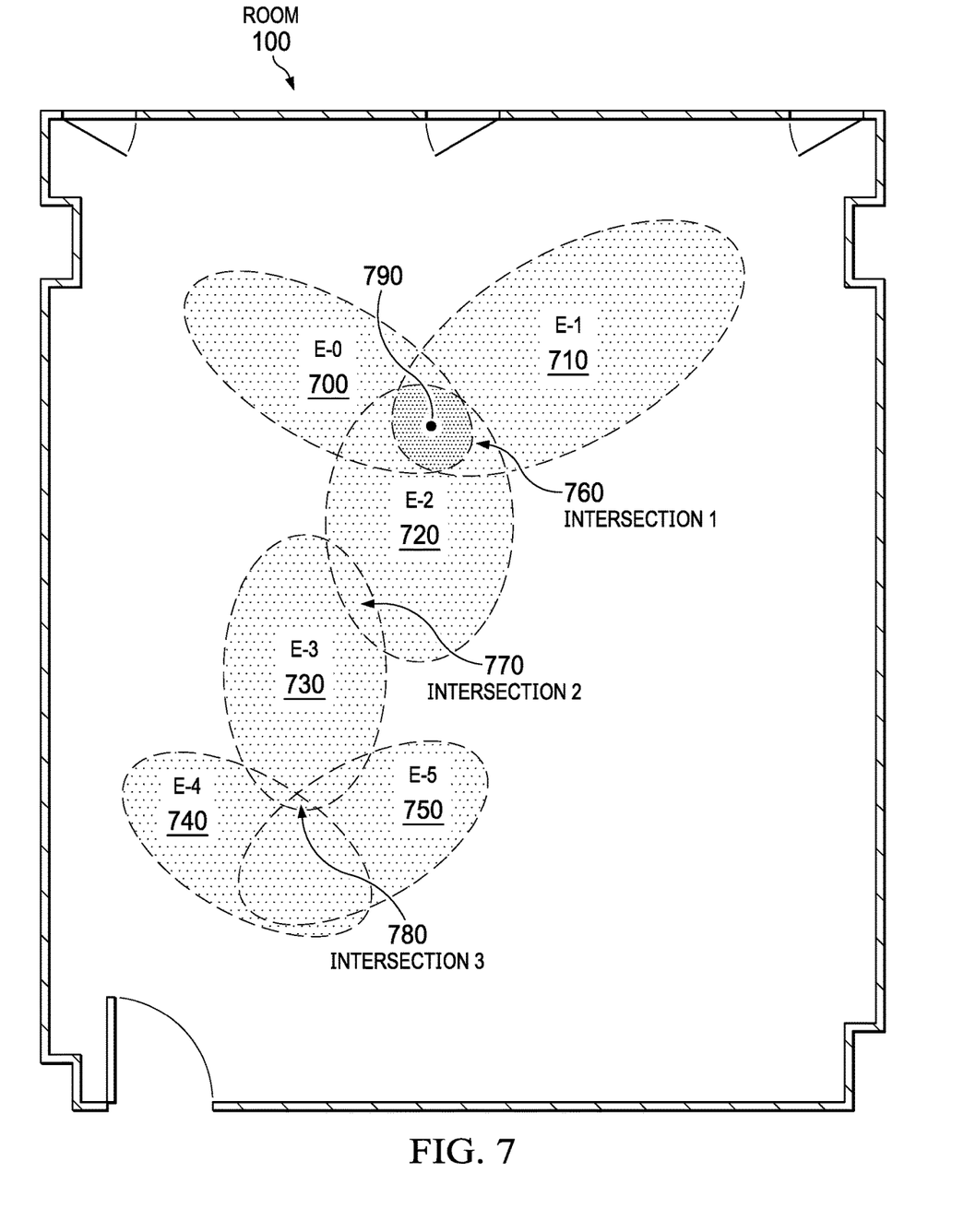
FIG. 7 illustrates an example disambiguation for a majority vote tie, according to an embodiment.
Figure 8:
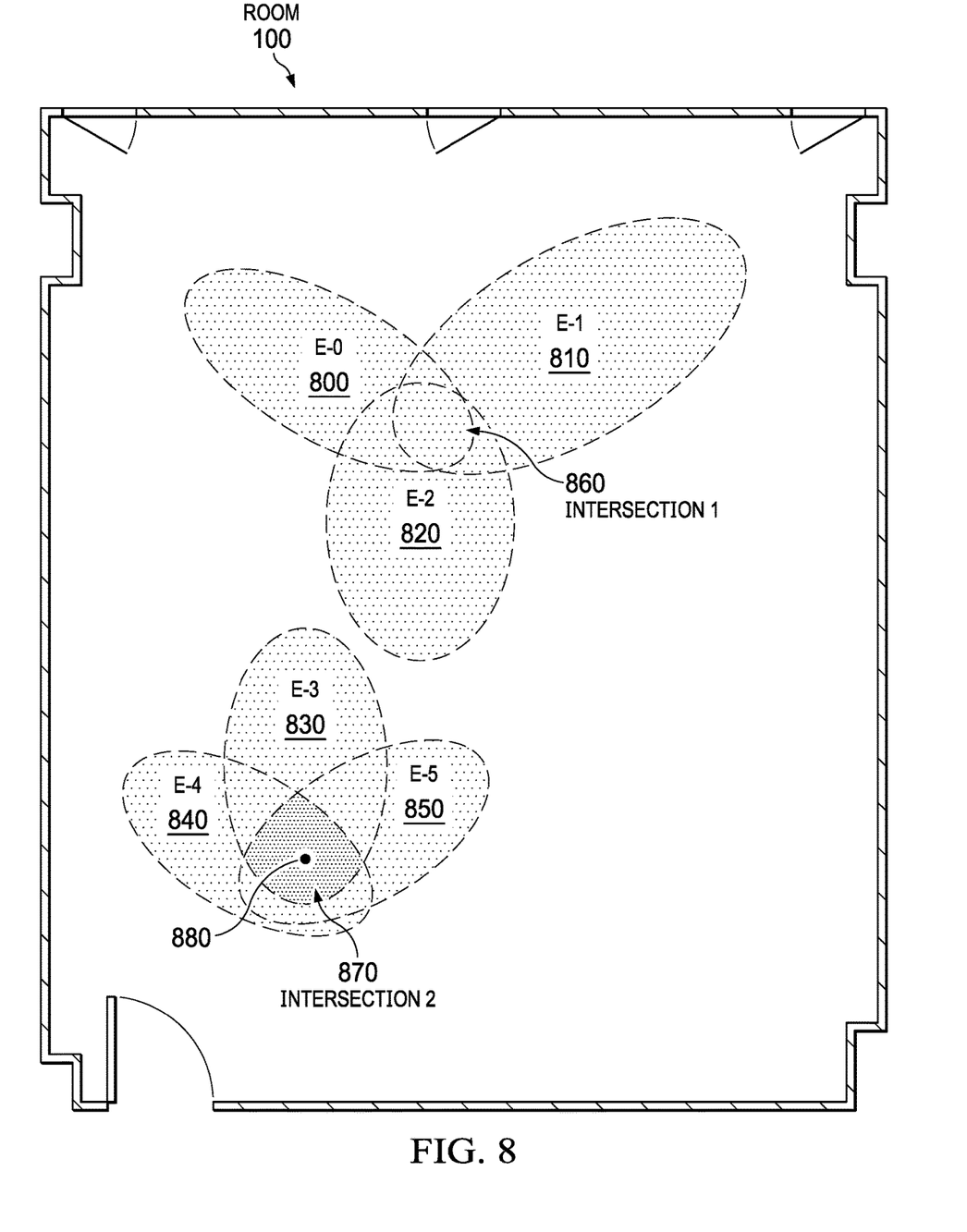
FIG. 8 illustrates another example disambiguation for a majority vote tie, according to an embodiment.

FIG. 7 illustrates an example disambiguation for a majority vote tie, according to an embodiment. In this example, there are three intersections 760, 770, and 780. The first intersection 760 and the third intersection 780 both comprise three error ellipses, which is the greatest number of intersecting ellipses. The first intersection 760 is chosen, however, because it has the larger ratio between the intersection and the union of the areas. The locators associated with the three ellipses 700, 710, 720 are selected for further processing, as described above, to generate a refined position estimate 790. FIG. 8 illustrates another example disambiguation for a majority vote tie. In this example, the first intersection 860 and the second intersection 870 both comprise three error ellipses, and the second intersection 870 is chosen because it has the larger ratio between the intersection and the union of the areas. The locators associated with the three ellipses 830, 840, 850 are selected for further processing to generate a refined position estimate 880.

Methodology

Figure 9:
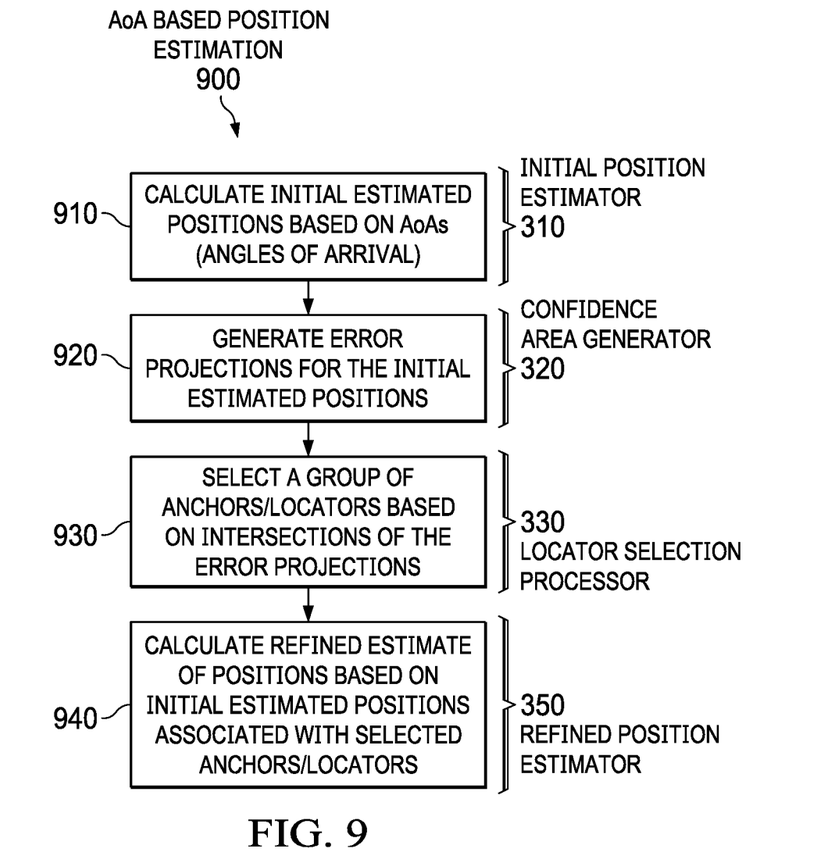
FIG. 9 illustrates a methodology for AoA based position estimation as performed by the location processing system of FIG. 1 or 3, according to an embodiment.

FIG. 9 illustrates a methodology 900 for AoA based position estimation as performed by the location processing system of FIG. 1 or 3, according to an embodiment. As shown, example method 900 includes a number of phases and sub-processes, the sequence of which may vary from one embodiment to another. However, when considered in aggregate, these phases and sub-processes form a process for AoA based position estimation, in certain of the embodiments described herein, such as illustrated in FIGS. 1-8, as described above. However, other system architectures can be used in other embodiments. Accordingly, the correlation of the various functions shown in FIG. 9 to the specific components illustrated in the drawings does not imply any structural and/or use limitations. Instead, other embodiments may include varying degrees of integration, in which multiple functions are effectively performed by one system.

In one embodiment, the process begins at operation 910, by calculating initial estimated positions of a target transmitter. Each of the initial estimated positions is based on an angle of arrival (AoA) estimate received from a locator.

At operation 920, an error projection is generated for each of the initial estimated positions. The error projection for each position may be generated as a projection in the positioning plane of the characteristic error associated with that locator. For example, the projection may be an ellipse having major and minor axes corresponding to known azimuth and elevation errors.

At operation 930, a group or subset of the locators is selected based on overlaps of the error projections. The group may contain some or all of the locators. In some embodiments, the selection is based on a majority vote in which the overlap that includes the greatest number of error projections is identified. Locators associated with the error projections in that identified overlap are then selected.

At operation 940, a refined estimate of the position of the target transmitter is calculated based on the initial estimated positions associated with the selected group of locators. In some embodiments, the refined position estimate is calculated as a least squared error minimization of the initial estimated positions associated with the select group of locators, or as an average of the initial estimated positions associated with the select group of locators. In some other embodiments, centroid locations are calculated for each pair of error projections in the identified overlap and the refined position estimate is calculated as an average of the centroid locations. In some embodiments, other suitable arithmetic functions, such as the median, may be used as an alternative to the average.

In some embodiments, additional operations may be performed, as described above in connection with the system. These additional operations may include performing a disambiguation operation in the case where the majority voting process identifies more than one overlap that includes the greatest number of error projections. For example, a disambiguation criterion may be used to select one of the multiple identified overlaps. In some embodiments, the disambiguation criterion may include the size of an area of the overlap, the size of a union of the error projections associated with the overlap, a ratio of the size of the area of the overlap to the size of the union of the error projections associated with the overlap, or a measure of signal strength associated with the AoA estimates.

Example Platform

Figure 10:
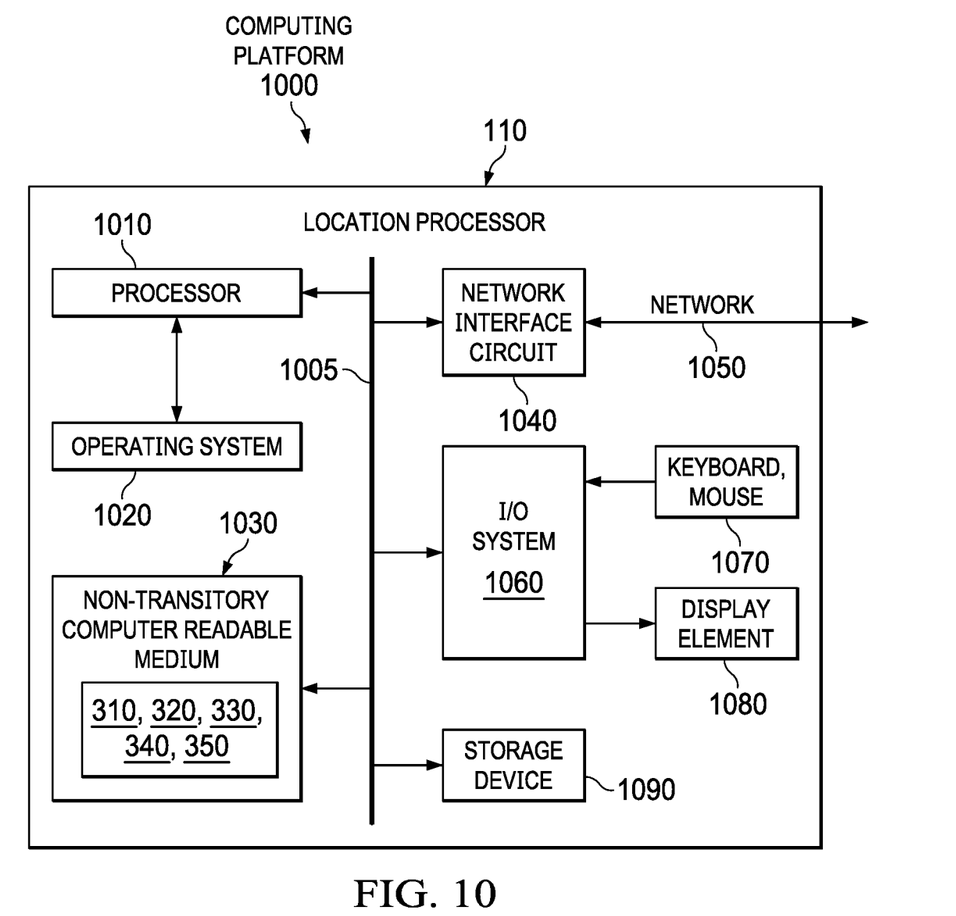
FIG. 10 is a block diagram schematically illustrating a computing platform configured to perform any of the techniques in this description, according to an embodiment.

FIG. 10 is a block diagram schematically illustrating a computing platform 1000 to perform any of the techniques as variously described herein, according to an embodiment. For example, in some embodiments, the location processor 110 of FIG. 1, or any portions thereof as illustrated in FIG. 3, and the methodology of FIG. 9, or any portions thereof, are implemented in the computing platform 1000.

In some embodiments, the computing platform 1000 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing device, such as an embedded processor, that has sufficient processor power and memory capacity to perform the operations described herein. In some embodiments, a distributed computational system is provided comprising a plurality of such computing devices.

The computing platform 1000 includes one or more storage devices 1090 and/or non-transitory computer-readable media 1030 having encoded thereon one or more computer-executable instructions or software for implementing techniques as variously described herein. In some embodiments, the storage devices 1090 include a computer system memory or random-access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as described herein. In some embodiments, the storage device 1090 includes other types of memory as well, or combinations thereof. In one embodiment, the storage device 1090 is provided on the computing platform 1000. In another embodiment, the storage device 1090 is provided separately or remotely from the computing platform 1000. The non-transitory computer-readable media 1030 include, but are not limited to, one or more types of hardware memory, non-transitory tangible media (for example, one or more magnetic storage disks, one or more optical disks, one or more USB flash drives), and the like. In some embodiments, the non-transitory computer-readable media 1030 included in the computing platform 1000 store computer-readable and computer-executable instructions or software for implementing various embodiments. In one embodiment, the computer-readable media 1030 are provided on the computing platform 1000. In another embodiment, the computer-readable media 1030 are provided separately or remotely from the computing platform 1000.

The computing platform 1000 also includes at least one processor 1010 for executing computer-readable and computer-executable instructions or software stored in the storage device 1090 and/or non-transitory computer-readable media 1030 and other programs for controlling system hardware. In some embodiments, virtualization is employed in the computing platform 1000 so that infrastructure and resources in the computing platform 1000 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 1005 is also provided to allow for communication between the various components listed above and/or other components not shown. Computing platform 1000 can be coupled to a network 1050 (e.g., a local or wide area network such as the internet), through network interface circuit 1040 to allow for communications with other computing devices, platforms, resources, clients, and Internet of Things (IoT) devices.

In some embodiments, a user interacts with the computing platform 1000 through an input/output system 1060 that interfaces with devices such as a keyboard and mouse 1070 and/or a display element (screen/monitor) 1080. The keyboard and mouse may be configured to provide a user interface to accept user input and guidance, and to otherwise control the location processor 110. The display element may be configured, for example, to display the results of location processing using the disclosed techniques. In some embodiments, the computing platform 1000 includes other I/O devices (not shown) for receiving input from a user, for example, a pointing device or a touchpad, etc., or any suitable user interface. In some embodiments, the computing platform 1000 includes other suitable conventional I/O peripherals. The computing platform 1000 can include and/or be operatively coupled to various suitable devices for performing one or more of the aspects as variously described herein.

In some embodiments, the computing platform 1000 runs an operating system (OS) 1020, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 1000 and performing the operations described herein. In one embodiment, the operating system runs on one or more cloud machine instances.

The various modules and components of the system, as shown in FIG. 3, can be implemented in software, such as a set of instructions (e.g., HTML, XML, C, C++, object-oriented C, JavaScript, Java, BASIC, Python, assembly language, etc.) encoded on any computer readable medium or computer program product (e.g., hard drive, server, disc, or other suitable non-transient memory or set of memories), that when executed by one or more processors, cause the various methodologies provided in this description to be carried out. In some examples, various functions and data transformations performed by the computing system, as described herein, can be performed by similar processors in different configurations and arrangements, and that the depicted embodiments are not intended to be limiting. Various components of this example embodiment, including the computing platform 1000, can be integrated into, for example, one or more desktop or laptop computers, workstations, tablets, smart phones, game consoles, set-top boxes, or other such computing devices. Other componentry and modules typical of a computing system, such as a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described herein. In a more general sense, any suitable combination of hardware, software, and firmware can be used, as will be apparent.

Further Example Embodiments

Example 1 is a location processing system including: an initial position estimator configured to calculate initial estimated positions of a target transmitter, each of the initial estimated positions based on an angle of arrival (AoA) estimate received from a corresponding locator; a confidence area generator configured to generate an error projection associated with each of the initial estimated positions, the error projection based on azimuth and elevation error characteristics of the locator associated with the initial estimated position; a locator selection processor configured to create a select group of the locators based on overlaps of the error projections, the select group of locators comprising a subset of the locators; and a refined position estimator configured to calculate a refined estimate of the position of the target transmitter based on the initial estimated positions associated with the select group of locators.

Example 2 includes the subject matter of Example 1. The locator selection processor is configured to: identify an overlapping area that includes the greatest number of error projections; and select the locators associated with the error projections in the identified overlap area, for the select group of locators.

Example 3 includes the subject matter of Example 2. Example 3 includes a disambiguation processor configured to determine that two or more of the overlap areas include the greatest number of error projections and to select one of the two or more overlap areas as the identified overlap area based on a disambiguation criterion.

Example 4 includes the subject matter of Example 3. The disambiguation criterion includes the size of the overlap area, the size of a union of the error projections associated with the overlap area, a ratio of the size of the overlap area to the size of the union of the error projections associated with the overlap area, and/or a measure of signal strength associated with the AoA estimates.

Example 5 includes the subject matter of any one of Examples 1 through 4. The refined position estimator is configured to calculate the refined estimate as the centroid of the identified overlap area.

Example 6 includes the subject matter of any one of Examples 1 through 5. The refined position estimator is configured to calculate centroid locations based on pairs of error projections in the identified overlap area and calculate the refined estimate as an average of the centroid locations.

Example 7 includes the subject matter of any one of Examples 1 through 6. The refined position estimator is configured to calculate the refined estimate as a least squared error minimization of the initial estimated positions associated with the select group of locators or as an average of the initial estimated positions associated with the select group of locators.

Example 8 includes the subject matter of any one of Examples 1 through 7. The locators are radio frequency (RF) anchors, and the target transmitter is an RF emitter device and is configured to emit a signal.

Example 9 includes the subject matter of any one of Examples 1 through 8. The locators are Bluetooth anchors or Wi-Fi anchors, and the target transmitter is a Bluetooth device or a Wi-Fi device.

Example 10 is a method for target position estimation. The method includes: calculating, by a processor-based system, initial estimated positions of a target transmitter, each of the initial estimated positions based on an angle of arrival (AoA) estimate received from a corresponding locator; generating, by the processor-based system, an error projection associated with each of the initial estimated positions, the error projection based on azimuth and elevation error characteristics of the locator associated with the initial estimated position; creating, by the processor-based system, a select group of the locators based on overlaps of the error projections, the select group of locators comprising a subset of the locators; and calculating, by the processor-based system, a refined estimate of the position of the target transmitter based on the initial estimated positions associated with the select group of locators.

Example 11 includes the subject matter of Example 10 and includes: identifying an overlap area that includes the greatest number of error projections; and selecting the locators associated with the error projections in the identified overlap area, for the select group of locators.

Example 12 includes the subject matter of Example 11 and includes: determining that two or more of the overlap areas include the greatest number of error projections and selecting one of the two or more overlap areas as the identified overlap area based on a disambiguation criterion.

Example 13 includes the subject matter of Example 12. The disambiguation criterion includes the size of the overlap area, the size of a union of the error projections associated with the overlap area, a ratio of the size of the overlap area to the size of the union of the error projections associated with the overlap area, and/or a measure of signal strength associated with the AoA estimates.

Example 14 includes the subject matter of any one of Examples 10 through 13 and includes calculating the refined estimate as the centroid of the identified overlap area.

Example 15 includes the subject matter of any one of Examples 10 through 14 and includes calculating centroid locations based on pairs of error projections in the identified overlap area and calculating the refined estimate as an average of the centroid locations, or calculating the refined estimate as a least squared error minimization of the initial estimated positions associated with the select group of locators, or calculating the refined estimate as an average of the initial estimated positions associated with the select group of locators.

Example 16 is a computer program product including one or more non-transitory machine-readable mediums encoded with instructions that when executed by one or more processors cause a process to be carried out for target position estimation. The process includes: calculating initial estimated positions of a target transmitter, each of the initial estimated positions based on an angle of arrival (AoA) estimate received from a corresponding locator; generating an error projection associated with each of the initial estimated positions, the error projection based on azimuth and elevation error characteristics of the locator associated with the initial estimated position; creating a select group of the locators based on overlaps of the error projections, the select group of locators comprising a subset of the locators; and calculating a refined estimate of the position of the target transmitter based on the initial estimated positions associated with the select group of locators.

Example 17 includes the subject matter of Example 16 and includes: identifying an overlap area that includes the greatest number of error projections; and selecting the locators associated with the error projections in the identified overlap area, for the select group of locators.

Example 18 includes the subject matter of Example 17 and includes determining that two or more of the overlap areas include the greatest number of error projections and selecting one of the two or more overlap areas as the identified overlap area based on a disambiguation criterion.

Example 19 includes the subject matter of Example 18. The disambiguation criterion includes the size of the overlap area, the size of a union of the error projections associated with the overlap area, a ratio of the size of the overlap area to the size of the union of the error projections associated with the overlap area, and/or a measure of signal strength associated with the AoA estimates.

Example 20 includes the subject matter of any one of Examples 17 through 19 and includes calculating the refined estimate as the centroid of the identified overlap area.

Example 21 includes the subject matter of any one of Examples 17 through 19 and includes calculating centroid locations based on pairs of error projections in the identified overlap area and calculating the refined estimate as an average of the centroid locations, or calculating the refined estimate as a least squared error minimization of the initial estimated positions associated with the select group of locators, or calculating the refined estimate as an average of the initial estimated positions associated with the select group of locators.

Modifications are possible in the described embodiments, and other embodiments are possible, within the scope of the claims.

What is claimed is:

1. A location processing system comprising:
    an initial position estimator configured to calculate initial estimated positions of a target transmitter, each of the initial estimated positions based on an angle of arrival (AoA) estimate received from a corresponding locator;
    a confidence area generator configured to generate an error projection associated with each of the initial estimated positions, the error projection based on azimuth and elevation error characteristics of the locator associated with the initial estimated position;
    a locator selection processor configured to create a select group of the locators based on overlaps of the error projections, the select group of locators comprising a subset of the locators; and
    a refined position estimator configured to calculate a refined estimate of the position of the target transmitter based on the initial estimated positions associated with the select group of locators.

2. The location processing system of claim 1, wherein the locator selection processor is configured to:
    identify an overlapping area that includes the greatest number of error projections; and
    select the locators associated with the error projections in the identified overlap area, for the select group of locators.

3. The location processing system of claim 2, further comprising a disambiguation processor configured to determine that two or more of the overlap areas include the greatest number of error projections and to select one of the two or more overlap areas as the identified overlap area based on a disambiguation criterion.

4. The location processing system of claim 3, wherein the disambiguation criterion includes a size of the overlap area, a size of a union of the error projections associated with the overlap area, a ratio of the size of the overlap area to the size of the union of the error projections associated with the overlap area, and/or a measure of signal strength associated with the AoA estimates.

5. The location processing system of claim 2, wherein the refined position estimator is configured to calculate the refined estimate as a centroid of the identified overlap area.

6. The location processing system of claim 2, wherein the refined position estimator is configured to calculate centroid locations based on pairs of error projections in the identified overlap area and calculate the refined estimate as an average of the centroid locations.

7. The location processing system of claim 1, wherein the refined position estimator is configured to calculate the refined estimate as a least squared error minimization of the initial estimated positions associated with the select group of locators or as an average of the initial estimated positions associated with the select group of locators.

8. The location processing system of claim 1, wherein the locators are radio frequency (RF) anchors, and the target transmitter is an RF emitter device and is configured to emit a signal.

9. The location processing system of claim 1, wherein the locators are Bluetooth anchors or Wi-Fi anchors, and the target transmitter is a Bluetooth device or a Wi-Fi device.

10. A method for target position estimation, the method comprising:
    calculating, by a processor-based system, initial estimated positions of a target transmitter, each of the initial estimated positions based on an angle of arrival (AoA) estimate received from a corresponding locator;
    generating, by the processor-based system, an error projection associated with each of the initial estimated positions, the error projection based on azimuth and elevation error characteristics of the locator associated with the initial estimated position;
    creating, by the processor-based system, a select group of the locators based on overlaps of the error projections, the select group of locators comprising a subset of the locators; and
    calculating, by the processor-based system, a refined estimate of the position of the target transmitter based on the initial estimated positions associated with the select group of locators.

11. The method of claim 10, further comprising:
    identifying an overlap area that includes the greatest number of error projections; and
    selecting the locators associated with the error projections in the identified overlap area, for the select group of locators.

12. The method of claim 11, further comprising determining that two or more of the overlap areas include the greatest number of error projections and selecting one of the two or more overlap areas as the identified overlap area based on a disambiguation criterion.

13. The method of claim 12, wherein the disambiguation criterion includes a size of the overlap area, a size of a union of the error projections associated with the overlap area, a ratio of the size of the overlap area to the size of the union of the error projections associated with the overlap area, and/or a measure of signal strength associated with the AoA estimates.

14. The method of claim 11, further comprising calculating the refined estimate as a centroid of the identified overlap area.

15. The method of claim 10, further comprising calculating centroid locations based on pairs of error projections in an identified overlap area and calculating the refined estimate as an average of the centroid locations, or calculating the refined estimate as a least squared error minimization of the initial estimated positions associated with the select group of locators, or calculating the refined estimate as an average of the initial estimated positions associated with the select group of locators.

16. A computer program product including one or more non-transitory machine-readable mediums encoded with instructions that when executed by one or more processors cause a process to be carried out for target position estimation, the process comprising:
   calculating initial estimated positions of a target transmitter, each of the initial estimated positions based on an angle of arrival (AoA) estimate received from a corresponding locator;
   generating an error projection associated with each of the initial estimated positions, the error projection based on azimuth and elevation error characteristics of the locator associated with the initial estimated position;
   creating a select group of the locators based on overlaps of the error projections, the select group of locators comprising a subset of the locators; and
   calculating a refined estimate of the position of the target transmitter based on the initial estimated positions associated with the select group of locators.

17. The computer program product of claim 16, wherein the process further comprises:
   identifying an overlap area that includes the greatest number of error projections; and
   selecting the locators associated with the error projections in the identified overlap area, for the select group of locators.

18. The computer program product of claim 17, wherein the process further comprises determining that two or more of the overlap areas include the greatest number of error projections and selecting one of the two or more overlap areas as the identified overlap area based on a disambiguation criterion.

19. The computer program product of claim 18, wherein the disambiguation criterion includes a size of the overlap area, a size of a union of the error projections associated with the overlap area, a ratio of the size of the overlap area to the size of the union of the error projections associated with the overlap area, and/or a measure of signal strength associated with the AoA estimates.

20. The computer program product of claim 17, wherein the process further comprises calculating the refined estimate as a centroid of the identified overlap area.

21. The computer program product of claim 17, wherein the process further comprises calculating centroid locations based on pairs of error projections in the identified overlap area and calculating the refined estimate as an average of the centroid locations, or calculating the refined estimate as a least squared error minimization of the initial estimated positions associated with the select group of locators, or calculating the refined estimate as an average of the initial estimated positions associated with the select group of locators.

* * * * *